(12) United States Patent
Aoki

(10) Patent No.: US 6,323,444 B1
(45) Date of Patent: Nov. 27, 2001

(54) SEAT WEIGHT MEASURING APPARATUS

(75) Inventor: Hiroshi Aoki, Shiga (JP)

(73) Assignee: Takata Corporation, Shiga (JP)

( * ) Notice: Subject to any disclaimer, the term of this patent is extended or adjusted under 35 U.S.C. 154(b) by 0 days.

(21) Appl. No.: 09/521,881

(22) Filed: Mar. 9, 2000

(30) Foreign Application Priority Data

Mar. 9, 1999 (JP) ............................... H11-061339

(51) Int. Cl.$^7$ ............................. G01G 19/52; B06N 2/00
(52) U.S. Cl. ................... 177/144; 177/256; 177/DIG. 9; 180/273; 280/735
(58) Field of Search ................... 177/136, 144, 177/256, 257, 258, 259, DIG. 9; 180/273; 280/735

(56) References Cited

U.S. PATENT DOCUMENTS

| | | | | |
|---|---|---|---|---|
| 3,835,946 | * | 9/1974 | Mettler | 177/256 |
| 4,258,810 | * | 3/1981 | Susor | 177/128 |
| 4,297,875 | * | 11/1981 | Kuhnle et al. | 177/211 |
| 4,411,327 | * | 10/1983 | Lockery et al. | 177/211 |
| 4,880,069 | * | 11/1989 | Bradley | 177/211 |
| 5,573,269 | * | 11/1996 | Gentry et al. | 280/735 |
| 5,600,104 | * | 2/1997 | McCauley et al. | 177/136 |
| 5,739,757 | * | 4/1998 | Gioutsos | 280/735 |
| 5,998,742 | * | 12/1999 | Liu et al. | 177/256 |
| 6,039,344 | | 3/2000 | Mehney et al. | 280/735 |
| 6,069,325 | * | 5/2000 | Aoki | 177/136 |
| 6,087,598 | * | 7/2000 | Munch | 177/144 |

FOREIGN PATENT DOCUMENTS

| | | |
|---|---|---|
| 0 950 560 A2 | 4/1999 | (EP) . |
| 2 337 027 A | 5/1998 | (GB) . |
| 2 333 070 A | 12/1998 | (GB) . |
| 9-156666 | 6/1997 | (JP) . |
| 10-121627 | 5/1998 | (JP) . |

* cited by examiner

Primary Examiner—Randy W. Gibson
(74) Attorney, Agent, or Firm—Foley & Lardner

(57) ABSTRACT

To provide a seat weight measuring apparatus capable of estimating with higher precision the weight and the center of gravity of a passenger on the seat and with reduced cost, a seat weight measuring apparatus is provided. The seat weight measuring apparatus comprises a load cell, a connecting mechanism, which connects a seat and the seat fixing portion of the vehicle body, and a transmitting mechanism which transmits the action of the seat weight on the connecting mechanism to the load cell. In the transmitting mechanism and the connecting mechanism, arms are pivotally supported by horizontal pivots so that the arms can pivot about the pivots. Actions according to the pivotal movements of the arms are transmitted to a load cell. Loads on the front side portion and the rear-side portion of the seat are each measured by one center load cell.

20 Claims, 14 Drawing Sheets

(A)

(B)

(A)

(B)

(A)

(B)

(A)

(B)

(A)

forward (B)

(A)

forward (B)

SEAT WEIGHT MEASURING APPARATUS

BACKGROUND OF THE INVENTION

1. Field of the Invention

The present invention relates to an apparatus for measuring the weight of a vehicle seat including the weight of a passenger sitting thereon and, more particularly, to a seat weight measuring apparatus which is improved to have higher precision in measuring the weight of a passenger sitting on a vehicle seat. Further, it relates to a seat weight measuring apparatus capable of detecting the center of gravity of a passenger with a smaller number of load cells.

2. Description of the Related Art

Automobiles are equipped with seat belts and airbags to secure safety for passengers. In recent years, there is a trend for controlling the operation of such safety devices according to the weight (body weight) and/or posture of a passenger for improved performance of seat belts and airbags. For example, the amount of gas to be introduced into the airbag, an airbag inflating speed, or a pre-tension of the seat belt may be adjusted according to the weight and/or posture of a passenger. For that purpose, some means are needed for measuring the weight of the passenger sitting on the seat. In addition, for estimating the posture of the passenger, the position of the center of gravity of the passenger on the seat can be referred.

An example of such means includes a proposal (Japanese Patent Applications No. 9-156666, No. 10-121627, and the like filed by the applicant of this invention) which involves arranging load sensors (load cells) at four corners of the seat under seat rails and summing vertical loads acting on the load cells to know the weight and the center of gravity of the passenger. According to the proposed method, the position of the center of gravity of the passenger on the seat can be also obtained.

However, since such seat weight measuring apparatuses are installed in general motor vehicles, these must be manufactured at low cost. Further, these must be easily wired and easily assembled. It is necessary for accurate measuring to exclude other load than the weight of a seat and the weight of a passenger (or an object) on the seat.

SUMMARY OF THE INVENTION

An object of the present invention which is made in view of the above-described problems is to provide a seat weight measuring apparatus capable of decreasing manufacturing cost and assembly cost and capable of weight measurement with higher precision.

In order to solve the problems described above, an a seat weight measuring apparatus of a first aspect of the present invention is an apparatus for measuring the seat weight of a vehicle seat including the weight of a passenger sitting thereon, comprising: a load cell having a plurality of sensors, each of which converts at least a part of the seat weight into an electrical signal; connecting mechanisms arranged at four locations, front and rear on left and right sides, which bear the seat weight, for connecting the vehicle seat and the seat fixing portions of a vehicle body; and transmitting mechanisms for transmitting the action of the seat weight born by the connecting mechanisms to the load sensors, wherein the one load cell includes a plurality of the sensors, each of which the action is transmitted from each transmitting mechanism.

The load sensor for measuring loads on front and rear locations on left and right sides of the seat are arranged as compact as possible, thereby reducing the number of load cells. Therefore, the manufacturing cost and also the assembly/wiring cost are reduced. Even with the reduced number of the load cells, the loads on the four locations, front and rear on left and right sides, can be measured, thereby detecting the center of gravity of the passenger.

It is preferable, in the seat weight measuring apparatus of the present invention, that the transmitting mechanism selectively transmits vertical loads on the connecting mechanisms to the load sensors by canceling lateral loads.

The transmitting mechanism transmits as little lateral loads as possible from the connecting mechanism to the load sensor wherein the lateral loads may cause error of the load sensors. Therefore, the weight of the passenger can be measured with higher precision.

It should be noted that the intention of the seat weight measuring apparatus as described in this specification is basically to measure the weight of a passenger sitting on a vehicle seat. Accordingly, an apparatus for measuring only the weight of a passenger by canceling the weight of a vehicle seat itself is also contained in the range of the seat weight measuring apparatus disclosed by this specification.

In the seat weight measuring apparatus according to one concrete aspect of the present invention, the connecting mechanisms and/or the transmitting mechanisms include arms pivotally supported by pivot shafts extending perpendicular to the vertical direction so that the actions according to the pivotal movements of the arms are transmitted to the load sensors. It is characterized in that the one load cell includes a plurality of the sensors, each of which the action is transmitted from each arm.

Because of the functions of the pivot shafts and the arms, most of lateral load exerted on the connecting mechanisms is born by the pivot shafts, thereby preventing the transmission of the lateral load from the arms to the load sensors. This enables the weight of the passenger to be measured more precisely.

It is preferable that the seat weight measuring apparatus of this aspect further comprises burdening members, each of which is pivotally connected to each arm, for bearing at least a part of the seat weight. This makes the connection of the arms and the seat smooth.

It is preferable, in the seat weight measuring apparatus of this aspect, that the sensor and the arms are connected to each other by one horizontal shaft so as to allow the pivotal movement in the vertical direction. Even when a lateral positional variation arises on the arm, the variation is absorbed at the action point so as not to be transmitted to the load sensor.

A seat weight measuring apparatus of a second aspect of the present invention is an apparatus for measuring the seat weight of a vehicle seat including the weight of a passenger sitting thereon, comprising: a load cell having a plurality of sensors, each of which converts at least a part of the seat weight into an electrical signal; connecting mechanisms arranged at four locations, front and rear on left and right sides, which bear the seat weight, for connecting the vehicle seat to the seat fixing portions of a vehicle body; and transmitting mechanisms for transmitting the action of the seat weight born by the connecting mechanisms to the load sensors, wherein the transmitting mechanism has a designed flexible configuration at at least one controlled position thereof. It should be noted that the designed flexible configuration means a portion, of which the shape and/or material are intentionally selected or determined to be easily deflected.

The presence he flexible configuration permits wide allowance limits of error in the parts and their assembly. It also exhibits work and effect of protecting the sensor by limiting the propagation of shock wave.

It is preferable, in the seat weight measuring apparatus of the present invention, that certain play exists between the arm and the load cell. This play exhibits the same work and effect as the flexible configuration as mentioned above. It also exhibits work and effect of absorbing horizontal dislocation due to the pivotal movement of the arm.

It is preferable that the seat weight measuring apparatus of the present invention further comprises burdening members, each of which is pivotally connected to each arm, for bearing at least a part of the seat weight, wherein a horizontal distance (span) between the pivot shaft of the arm and a point where the burdening member is connected to the arm: a horizontal distance between the pivot of the arm and a point where the arm acts on the load sensor is in a range from 1:3 to 1:10.

In this range, loads directly applied to the load cells can be reduced without lowering the precision of the measurement, allowing low strength constructions around the load cells.

The seat weight measuring apparatus of this aspect, the horizontal distance between the pivot of the arm and the point where the burdening member is connected to the arm is preferably from 15 mm to 50 mm.

This range allows the bearing of a vertical load up to 100 kg. Non special materials such as steel (from 2 mm to 2.3 mm in thickness) or pins (from 6 mm to 10 mm in diameter) can be employed as members for the pivotal movement of the arms, thereby reducing the cost of parts.

In the seat weight measuring apparatus of this aspect, the horizontal distance between the pivot of the arm and the point where the arm acts on the load sensor is preferably from 120 mm to 180 mm.

This range allows transmission of forces born by two points to one sensor and provides suitable amount of deflection (about from ±1 mm to ±3 mm).

BRIEF DESCRIPTION OF THE DRAWINGS

FIGS. 3(A), 3(B) show the general structure of the seat weight measuring apparatus according to the first embodiment of the present invention, in which FIG. 3(A) is an exploded perspective view thereof and FIG. 3(B) is a front sectional view of the pin bracket.

FIGS. 4(A) through 4(D) show the general structure of the seat weight measuring apparatus according to the first embodiment of the present invention, in which FIG. 4(A) is a plan view, FIG. 4(B) is a longitudinal sectional view, FIGS. 4(C) and 4(D) are front sectional views thereof.

FIGS. 7(A) through 7(C) are views of the first embodiment showing the relation between the sensor plate and the half arm, in which FIG. 7(A) is a plan view, FIG. 7(B) is a side view illustrating the non-loaded state, FIG. 7(C) is a side view schematically illustrating the loaded state.

DETAILED DESCRIPTION OF THE PREFERRED EMBODIMENTS

An explanation will be made in the following with reference to the drawings. First, the structures around a vehicle seat will be described with reference to FIGS. 8(A), 8(B).

Figure 8:
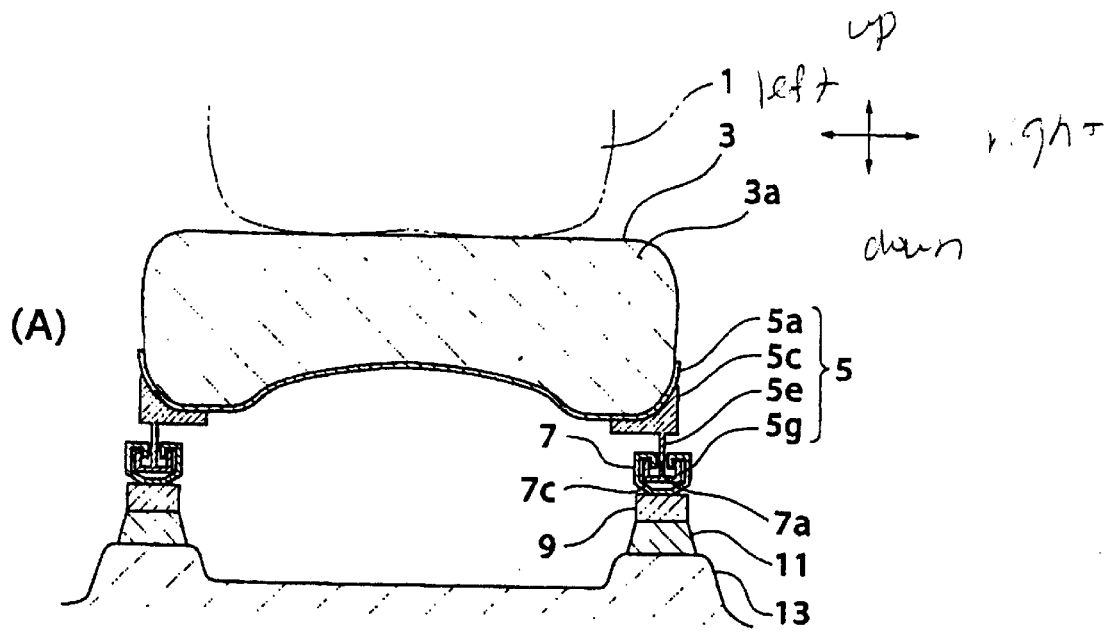
FIG. 8(A) is a front sectional view schematically showing a structural example for fixing a seat to a vehicle body and FIG. 8(B) is a side view thereof.
Figure 8:
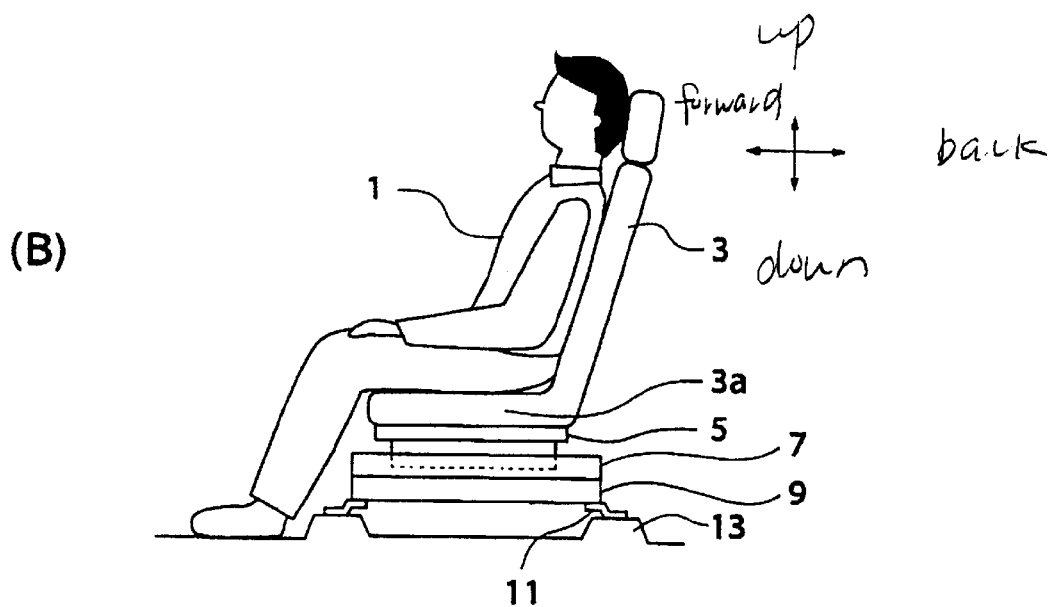

FIG. 8(A) is a front sectional view schematically showing a structural example for fixing a seat to a vehicle body and FIG. 8(B) is a side view thereof. It should be understood that arrows in the drawings indicate as follows. UP: the opposite direction of the gravitational direction when the vehicle is placed horizontally, DOWN: the gravitational direction, FORWARD: the forward direction of the vehicle, BACKWARD: the backward direction of the vehicle, LEFT: the left Ride as facing the forward direction of the vehicle, RIGHT: the right side as facing the same.

A seat 3 is shown in FIGS. 8(A), 8(B). A passenger 1 sits on a seat squab 3a of the seat 3. The seat squab 3a is supported at its lower surface by a seat frame 5 made of a steel plate. The seat frame 5 comprises components including a bottom plate 5a, lateral plates 5c, vertical plates 5e, and slide plates 5g. The bottom plate 5a extends to cover the lower surface of the seat squab 3a. The lateral plates 5c extend along the left and right sides of the lower surface of the bottom plate 5a. The vertical plates 5e are hung from the centerlines of the lower surface of the lateral plates 5c, respectively. The slide plates 5g project right and left of the respective vertical plates 5e like wings and the end portions of each slide plate 5g are bent upward.

Two seat rails 7 are arranged beneath right and left portions of the seat 3 so as to extend in the fore and aft direction and parallel to each other. The cross section of each seat rail 7 is formed in a U-like shape and has a concavity 7c therein and a groove 7a formed in the upper portion of the concavity 7c. Inserted in the groove 7a is the vertical plate 5e of the seat frame 5.

The slide plate 5g of the seat frame 5 is housed in the concavity 7c of the seat rail 7. The slide plate 5g is slidable in the fore and aft direction in the seat rail 7.

Connected to the lower surface of each seat rail 7 is a seat weight measuring apparatus 9. The seat weight measuring apparatus 9 has an elongated box-like profile extending in the fore and aft direction. The seat weight measuring apparatus 9 will be detailed later.

Attached to front and rear ends of the lower surface of the seat weight measuring apparatus 9 are seat brackets 11. The seat bracket; 11 are fixed to seat fixing portions 13 of the vehicle body by means of bolts.

Figure 1:
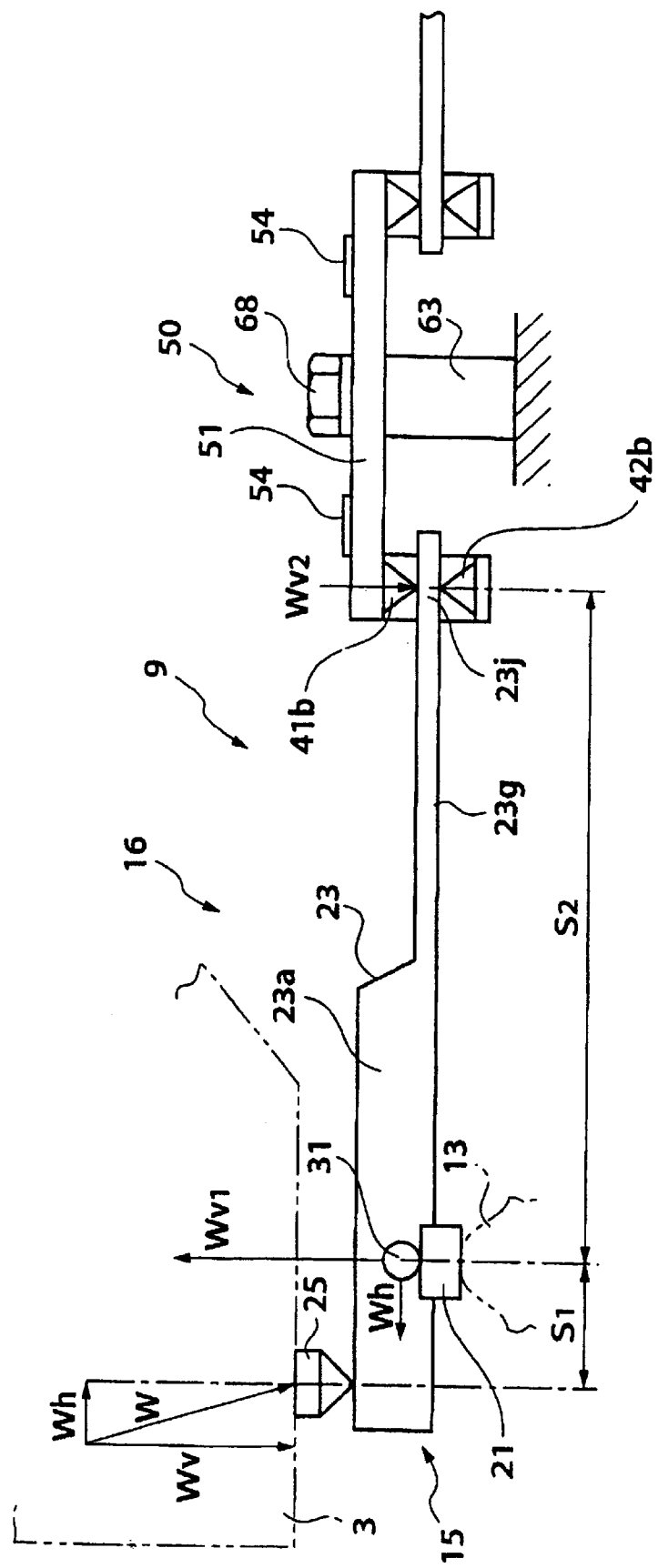
FIG. 1 is a side view schematically illustrating the construction of a seat weight measuring apparatus according to a first embodiment of the present invention.

FIG. 1 is a side view schematically illustrating the construction of a seat weight measuring apparatus according to a first embodiment of the present invention. It should be noted that the left and right directions in this figure refer to the fore and aft direction of the vehicle. Since the apparatus is substantially symmetric in the fore and aft direction, the illustration of the seat weight measuring apparatus on one side is omitted. Each of the seat weight measuring apparatus 9 of this embodiment comprises a connecting mechanism 15, which connects a seat 3 (including a seat frame and a seat rail) and the seat fixing portion 13 of the vehicle body to bear the seat weight, and a transmitting mechanism 16 which transmits action of the seat weight on the connecting mechanism 15 to a load sensor 54 of a load cell 50.

Each connecting mechanism 15 comprises a burdening member (pin bracket) 25, an arm (Z arm) 23, a base pin 31, and a base 21.

The burdening members 25 are arranged at four corners, front and rear on left and right sides of the seat 3, respectively and transmit the weight of the seat including the weight of a passenger sitting thereon to the arms 23. Each arm 23 is pivotable about each base pin 31. The base pin 31 is connected to the seat fixing portion 13 of the vehicle body via the base 21.

The arm 23 has a thin plate portion 23g extending to the right in this figure. The end of the thin plate portion 23g is an action portion 23j to the load cell 50. The thin plate portion 23g has a flexible structure (controlled flexible structure) which is relatively easily deflected. A portion in the arm 23 which composes in part the connecting mechanism 15 includes a rib-like wall 23a formed to increase its stiffness and strength.

The load cell 50 comprises the sensor plate 51 and strain gauges 54 attached on an upper surface of the sensor plate 51. Arranged on a left lower surface of the sensor plate 51 are supports 41b, 42b through which vertical load is transmitted from the action portion 23j of the arm 23 to the sensor plate 51. The load is measured by the strain gauge 54 on the sensor plate 51. could be understood that the right portion of the sensor plate 51 has the same structure as the left portion.

In this embodiment, the transmitting mechanism 16 comprises the arm 23 and the supports 41b, 42b. With these supports 41b, 42b, vertical load can be transmitted but lateral load except for a part of frictional force can not be transmitted.

Hereinafter, a description will now be made as regard to the transmission of loads in the seat weight measuring apparatus 9.

A load W of the seat 3 is transmitted from the burdening members 25 to the arms 23. The load W includes a vertical component Wv and a lateral component Wh.

The vertical component Wv includes a part of the weight of the seat 3 and the weight of the passenger. The loads exerted by the weight of the passenger to be transmitted from the respective burdening members 25 to the arms 23 are different according to the weight and the posture of the passenger, the acceleration of the vehicle, and the like.

The lateral component Wh of the load W mainly depends on the acceleration of the vehicle and the force of the passenger's legs thrusting against the vehicle floor.

It should be noted that a distance (span) between a position (contact portion) where the burdening member 25 acts on the arm 23 and the center line of the base pin 31 (pivot) is represented by S. and a distance (span) between the center line of the base pin 31 and the action portion 23j to the load cell 50 is represented by $S_2$.

Therefore, a vertical force Wv2 transmitted from the arm action portion 23j to the sensor plate 51 is given by the following expression:

$$Wv_2 = Wv \times S_1/S_2$$

On the other hand, most of the lateral component Wh as a part of W is born by the base pin 31 and is not transmitted to the sensor plate 51. That is, the transmitting mechanism 9 of the seat weight measuring apparatus has a characteristics of selectively transmitting the vertical component as a part of the load W from the seat 3 to the load cell 50.

Figure 2:
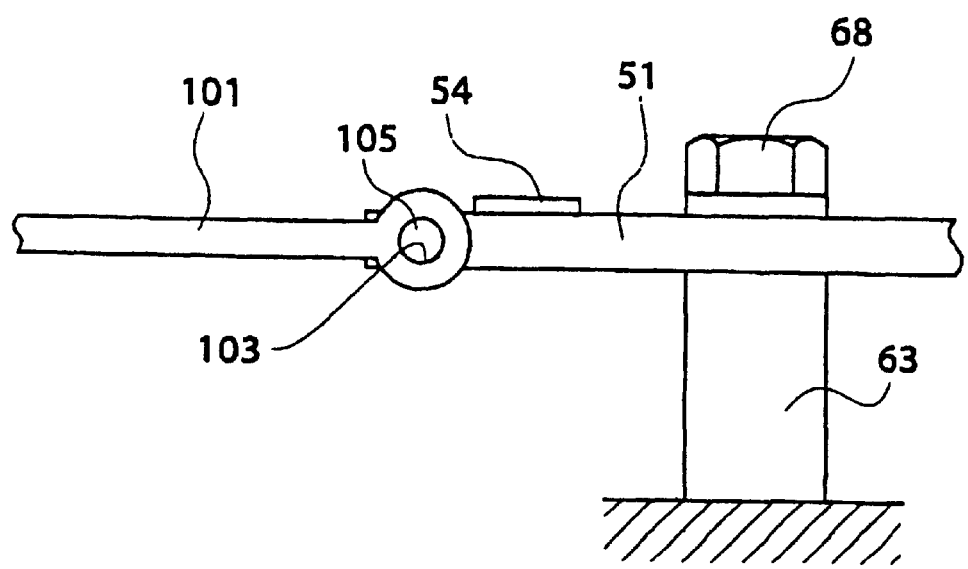
FIGS. 2(A), 2(B) are side views according to a second and third embodiment, respectively, of the connecting portion (action point) between the arm and the load sensor
Figure 2:
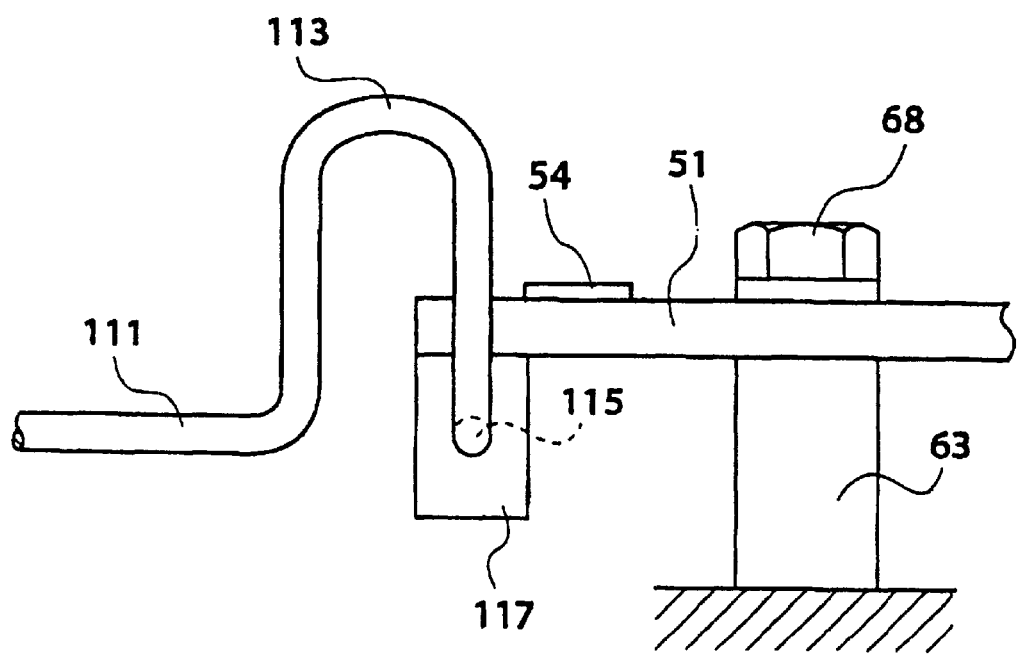

FIGS. 2(A), 2(B) are side views showing a second and third embodiment, respectively, of the connecting portion (action point) between the arm and the load cell.

FIG. 2(A) shows the second embodiment in which a pin hole 103 is formed at an end of an arm 101 and a bracket 107 of the sensor plate 51 is provided with a pin 105 so that the arm 101 and the sensor plate 51 are pivotally connected to each other. As structured above, torsional stress due to the deflection of the arm 101 can be absorbed, thereby exhibiting an effect that only vertical force is transmitted to the sensor plate 51.

FIG. 2(B) shows a third embodiment in which a curved portion 113 is formed at an end of an arm 111 and has a support 115 at its end which is connected to a bracket 117 of the sensor plate 51. The curved portion 113 is particularly easily deflected, exhibiting the same effect as that obtained by the pin 105.

Figure 3:
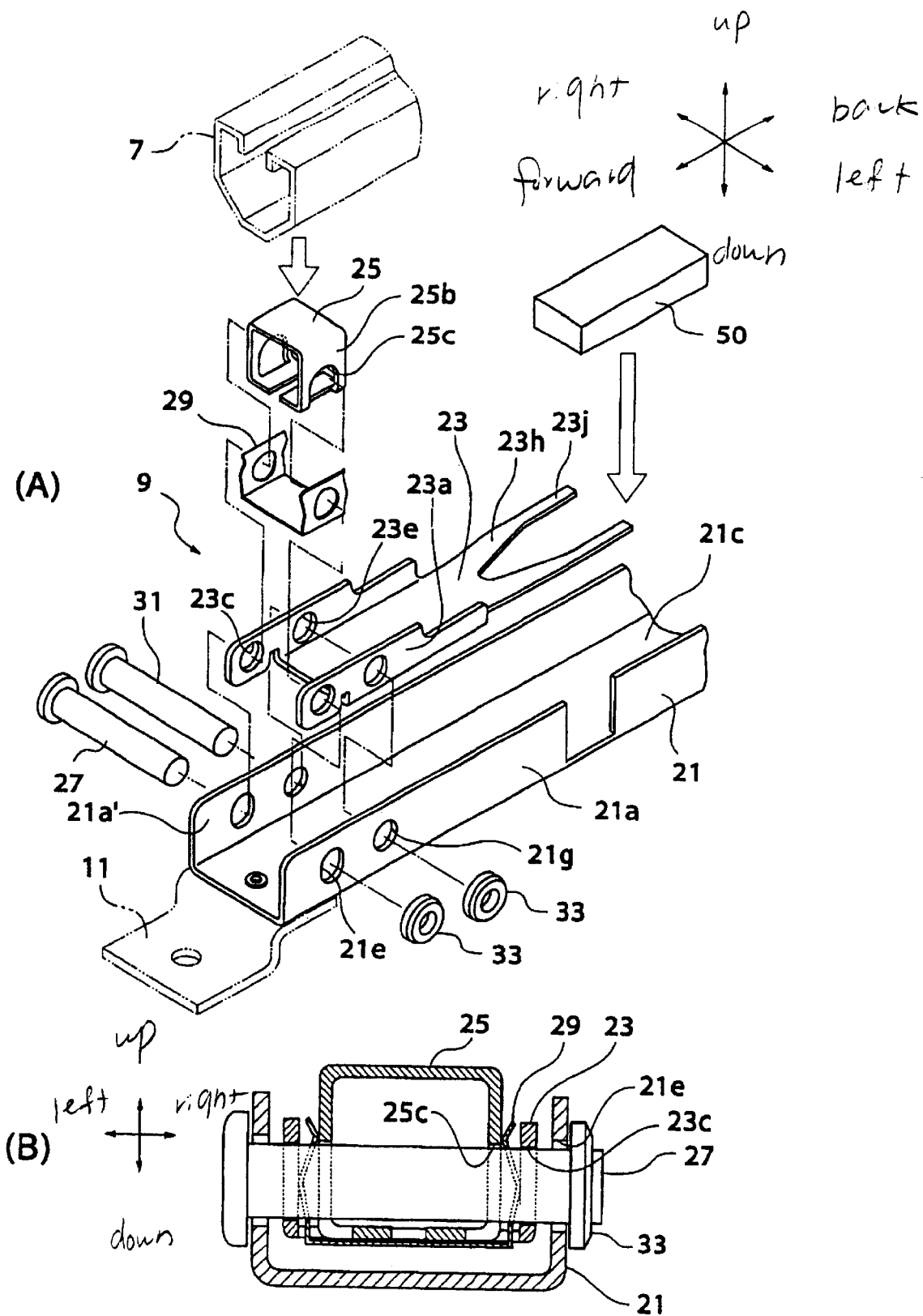

FIGS. 3(A), 3(B) show the general structure of the seat weight measuring apparatus according to the first embodiment of the present invention. FIG. 3(A) is an exploded perspective view and FIG. 3(B) is a sectional view of the pin bracket. In FIGS. 3(A), 3(B), and 4(A), 4(B) described in the following, the illustration of a rear half is omitted.

Figure 4:
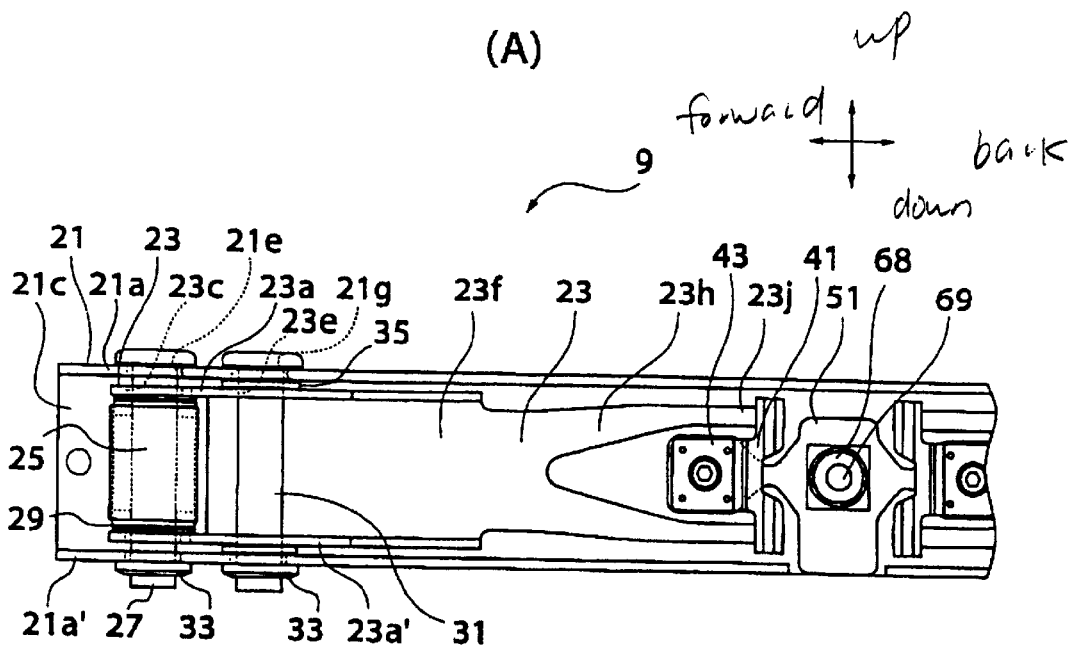
Figure 4:
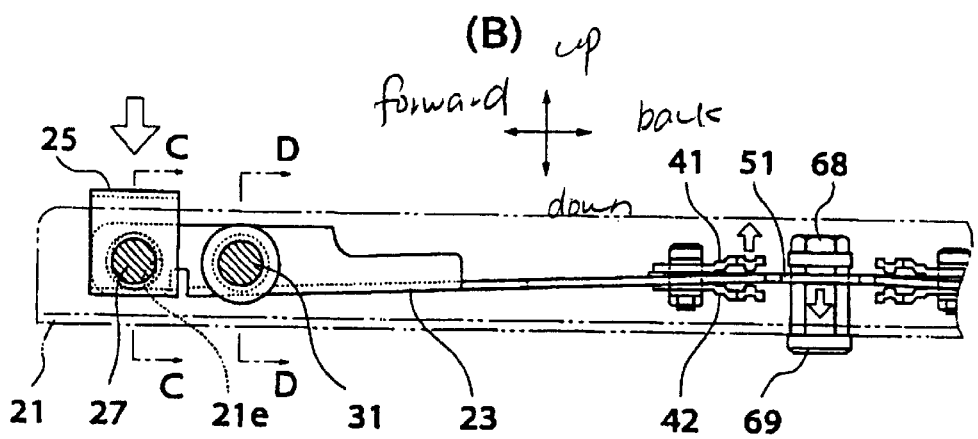
Figure 4:
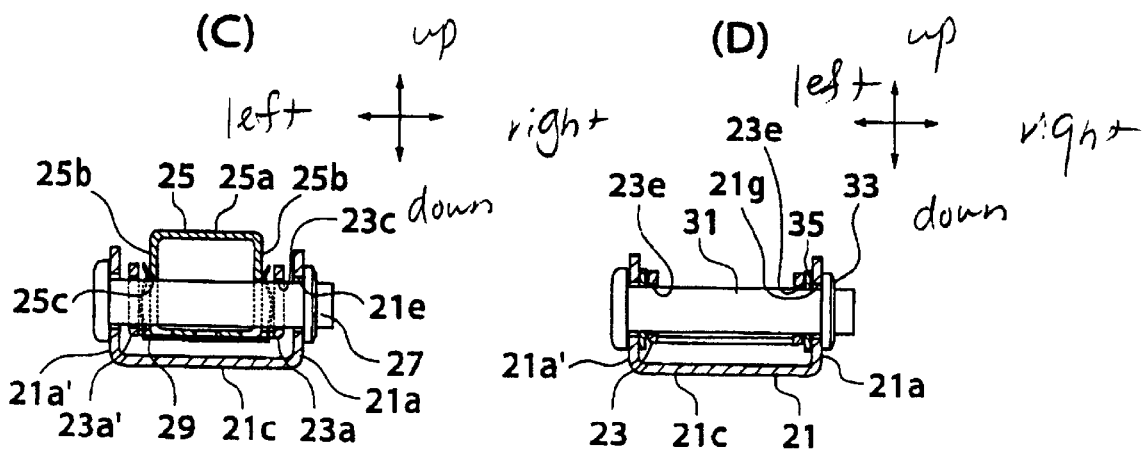
Figure 5:
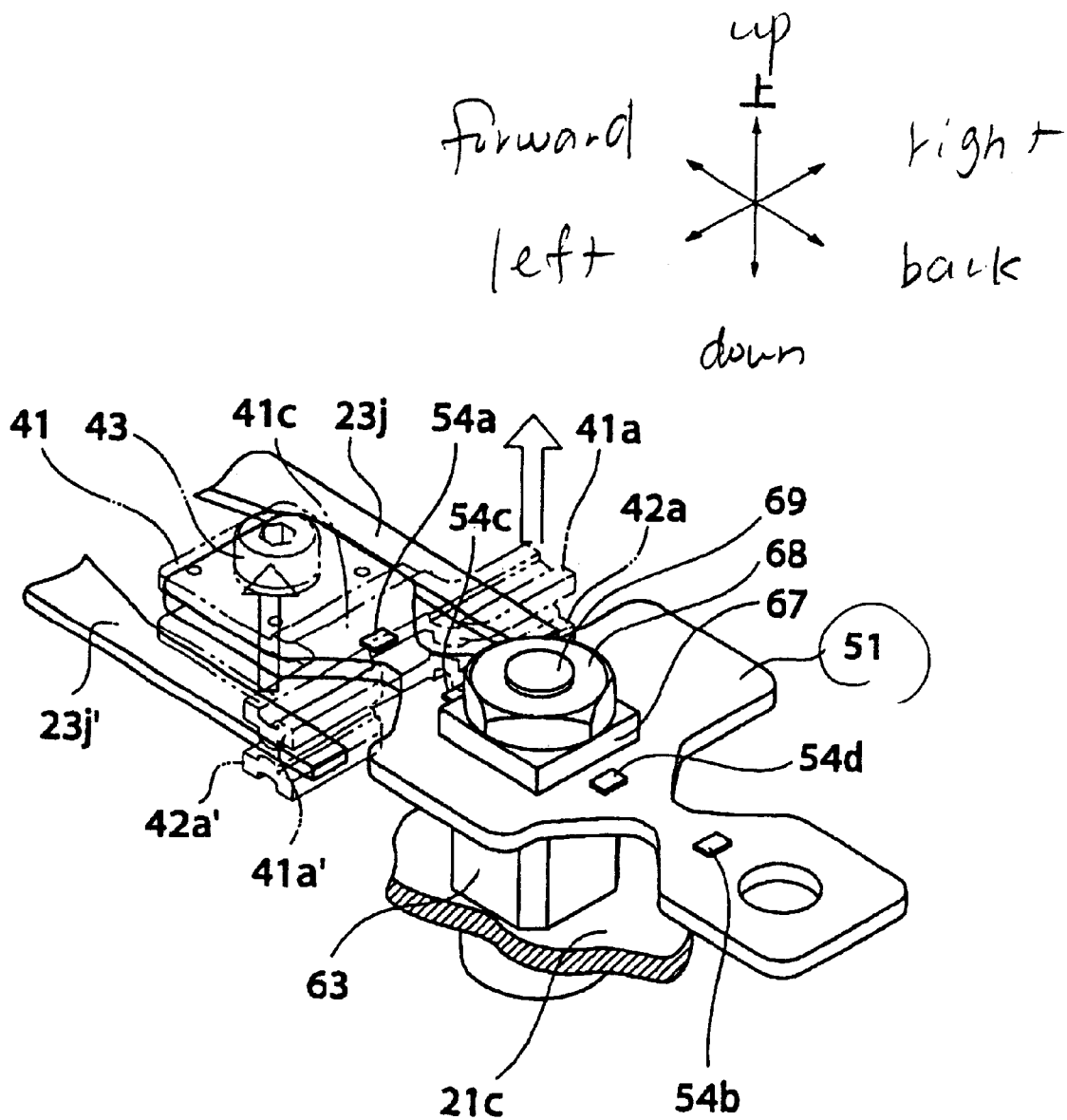
FIG. 5 is a partially broken perspective view showing detailed structure around the sensor plate according to the first embodiment.

FIGS. 4(A) through 4(D) show the general structure of the seat weight measuring apparatus according to the first embodiment of the present invention. FIG. 4(A) is a plan view, FIG. 4(B) is a longitudinal sectional view, FIGS. 4(C) and 4(D) are sectional views thereof, FIG. 5 is a partially broken perspective view showing detailed structure around the sensor plate.

Figure 6:
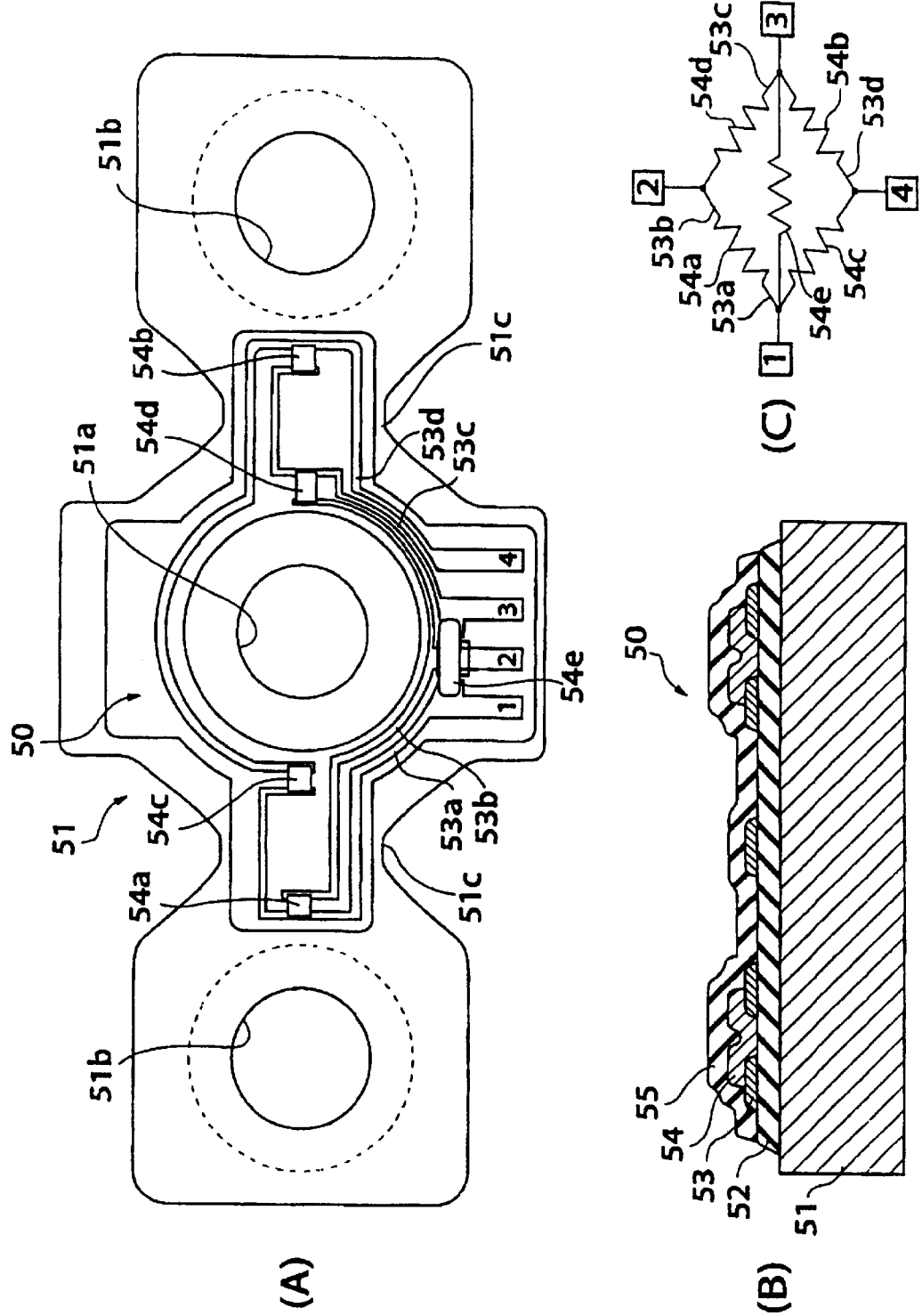
FIGS. 6(A–C) are plan views showing the detailed structure of the sensor plate according to the first embodiment.

FIG. 6(A) is a plan view showing the detailed structure of the sensor plate.

Figure 7:
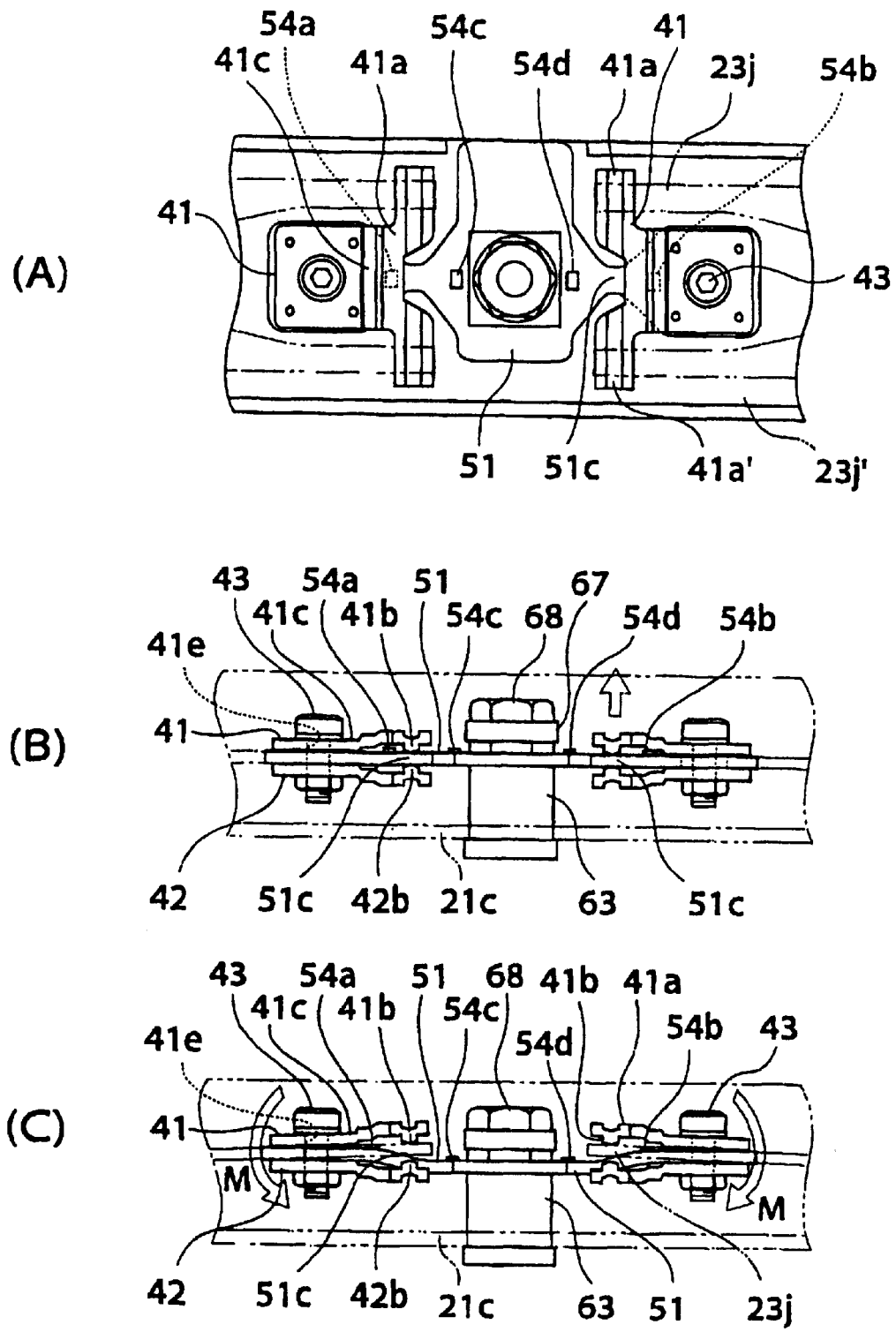

FIGS. 7(A) through 7(C) are views showing the relation between the sensor plate and the half arm. FIG. 7(A) is a plan view, FIG. 7(B) is a side view illustrating the non-loaded state, FIG. 7(C) is a side view schematically illustrating the loaded state.

The seat weight measuring apparatus 9 is structured to have an elongated base 21 as its body. The base 21 extends long in the fore and aft direction when mounted to the vehicle body and is a product made by press-working a steel plate having a U-shaped cross section, as shown in FIGS.

4(C), 4(D). The bottom of the base 21 is referred to as a bottom plate 21c and portions which stand from the left and right edges of the bottom plate 21c to form corners of 90° therebetween are referred to as side plates 21a, 21a'.

Each of the base side plates 21a, 21a' is provided with two pairs of pin holes 21e and 21g in front and rear portions, respectively. The pin holes 21e, 21g are formed to face the pin holes 21e, 21g of the opposite side plates 21a, 21a'.

The holes 21e near the front and rear ends of the base 21 are formed in portions away at a distance from the front and rear ends, respectively, wherein the distance corresponds to approximately ⅛ of the overall length of the base 21. The holes 21e are vertically elongated holes, as shown in FIG. 3(A). Inserted tough the elongated holes 21e are ends of bracket pins 27. Fitted on the left and right ends of each bracket pin 27 are retainers 33 preventing the bracket pin 27 from coming off the elongated holes 21e.

There are clearance between the bracket pin 27 and the elongated hole 21e all around the bracket pin 27 so that the bracket pin 27 is normally prevented from being in contact with the inner periphery of the elongated hole 21e. However, when excessive load is applied to the seat weight measuring apparatus 9 (concretely, to pin brackets 25), the bracket pins 27 are lowered to come in contact with lower portions of the inner peripheries of the elongated holes 21e whereby excess load is not transmitted to load sensors (the sensor plates 51, detailed later). That is, the pins 27 and the elongated holes 21e compose a part of a mechanism for defining the upper limit of load to be exerted on the sensor plates 51. The main function of each bracket pin 27 is transmitting the seat weight exerted on the pin bracket 25 to the Z arm 23.

The pin holes 21g are formed in positions closer to the center than the positions of the elongated holes 21e (at a distance corresponding to approximately ⅒ of the overall length of the base 21 from the elongated hole 21e). Inserted into the holes 21g are base pins 31. Each of the base pins 31 extends to bridge the left and right side plates 21a, 21a'. Fitted on the left and right ends of the pin 31 are retainers 33, thereby fixing the base pin 31 to the base 21. The base pin 31 is the pivot shaft of the Z arm 23.

The Z arms 23 are arranged inside of the base 21. Each of the Z arms 23 has a center portion, when seen in plan view, which is forked (into two branches 23h) and has a rectangular portion near the end. The Z arm 23 has side plates 23a formed by upwardly folding left and right edge portions thereof by 90°. The side plates 23a extend from the end to the middle portion. The branches 32h are only flat plates. The side plates 23a extend along the inner surfaces of the side plates 21a of the base 21. There are clearances between the side plates 23a and the side plates 21a.

Each of the Z arm side plates is provided with two pin holes 23c, 23e formed therein. Inserted into the pin holes 23c formed near the end is the bracket pin 27. The bracket pin 27 and the pin holes 23c slide little relative to each other. Inserted into the pin holes 23e at the center side is the base pin 31. The base pin 31 is the pivot of the Z arm 23, so the base pin 31 and the pin holes 23e slide relative to each other by pivotal movement of the Z arm 23. Sandwiched between the base side plates 21a about the base pin 31 and the Z arm side plates 23a are disk-like spacers 35 having holes.

The length of the branches 23h of the Z arm 23 corresponds substantially to a half of the overall length of the Z arm 23. The branches 23h are separated from each other in the right and left direction and extend toward the center of the base 21. Each of the branches 23h has a reduced width near the center. The action portions 23j at the ends of the branches 23h are clamped between wings 41a, 42a of upper and lower half arms 41, 42 as shown in FIGS. 5 and 7(A) through 7(C).

As a load is exerted on the pin bracket 25, the Z arm 23 slightly pivots (the maximum pivotal angle of approximately 5°) whereby the action portions 23j transmit the load to the sensor plate 51 through the half arms 41, 42.

The pin bracket 25 is formed to have an inverted U-shaped cross section as shown in FIG. 4(C). The length of the pin bracket 25 in the fore and aft direction substantially corresponds to ½₀ of that of the base 21. The pin bracket 25 has a flat upper surface 25a on which the seat rail 7 shown in FIGS. 8(A), 8(B) is mounted. The seat rail 7 is strongly fixed to the upper surface 25a by bolts or other fastening means.

The pin bracket 25 hag left and right side plates 25b downwardly projecting, of which lower ends are bent inwardly. The pin bracket 25 is disposed inside the Z arm 23 in such a manner as to have clearances between the side plates 25b and the Z arm side plates 23a. The side plates 25b are provided with pin holes 25c formed therein. Inserted into the pin holes 25c is a bracket pin 27. The inner diameter of each pin hole 25c is larger than the diameter of the bracket pin 27. The clearance between them absorbs dimensional tolerance of the seat and the vehicle body and/or unexpected deformation.

Disposed between the side plates 25b of the pin bracket 25 and the side plates 23b of the Z arm 23 is a spring plate 29 having spring washer portions with holes. The pin bracket 27 is loosely inserted into the holes of the spring washer portions. The spring plate 29 composes a centering mechanism for biasing the pin bracket 25 toward the center.

The centering mechanism as mentioned above makes the pin bracket 25 to be positioned as close to the center in the slidable range as possible.

In the seat weight measuring apparatus of this embodiment, the seat rail 7, the pin bracket 25, the Z arm 23, the base 21, and the seat bracket 11 compose in combination each connecting mechanism between the seat and the vehicle body.

Hereinafter, the structure around the sensor plate 51 will be described.

First, the structure of the sensor plate 51 itself will be described.

FIGS. 6(A) through 6(C) show a structural example of the sensor plate of the seat weight measuring apparatus according to the first embodiment of the present invention. FIG. 6(A) is a plan view of the sensor plate, FIG. 6(B) is a structural view of the section of the sensor plate for illustrating its concept, and FIG. 6(C) is a circuit diagram of the sensor.

Applied on the sensor plate (spring member) 51 as a base of the load cell 50 is an insulating layer (lower insulating layer) 52 for electrical insulation. selectively formed on the insulating layer 52 is a wiring layer 53. Further selectively formed on the wiring layer 53 is a resistant layer 54 which composes the strain gauge 54 as a load sensor. In addition, an insulating layer (upper insulating layer) 55 is applied over these layers as a protective layer. In this manner, the electrical circuit including resistors is directly laminated on the spring member 51, thereby reducing the working cost and the assembly cost and further improving the heat resistance and the corrosion resistance.

The sensor plate 51 is a rectangular plate having two necks as a whole. The sensor plate 51 is provided with a central hole 51a formed in the center thereof and bolt holes 51b formed in end portions thereof. The load cell 50 is formed around the central hole 51a and between the central hole 51a and the bolt holes 51b. V-like concavities are provided in both side edges of a region 51c between the central hole 51a and the bolt holes 51b. These concavities ensure positions to be deformed of the sensor plate 51, thereby preventing positional variation of distortion and stabilizing the sensitivity of the load cell 50.

The load cell 50 is substantially symmetrical about the center of the central hole 51a. The load cell 50 is composed of four strain gauges 54a, 54b, 54c, and 54d. Two of them 54a, 54b to be applied with tensile strain are arranged near the bolt holes 51b (near the ends), while the other two strain gauges 54c, 54d to be applied with compressive strain are arranged near the central hole 51a (central side). The strain gauges 54a, 54b, 54c, and 54d are connected to each other by wirings 53a, 53b, 53c, and 53d to form a bridge circuit shown in FIG. 6(C). Load applied on the front-side portion of the seat is measured by the two strain gauges 54a, 54c and load applied on the rear-side portion of the seat is measured by the two strain gauges 54b, 54d. Squares marked by numerals 1, 2, 3, 4 in FIGS. 6(A), 6(C) are terminals.

Arranged between the strain gauges 54a, 54c and the strain gauges 54b, 54d is a sensitivity control resistor 54e.

It should be noted that the load may be obtained by conversion from deflection of he sensor plate 51 detected by electrical capacitance pressure sensors or Hall elements, instead of the detection of distortion of the sensor plate 51 being detected by the strain gauges 54a, 54b, 54c, and 54d.

As shown in FIGS. 5 and 7(A)–7(C), the sensor plate 51 is strongly fixed to the top of a column 63 at the center of the base bottom plate 21c.

In this embodiment, arranged on each of the left and right portions of the seat is one load cell 50 so that loads on the front-side portion and the rear-side portion of the seat are each measured by one load cell 50, thereby reducing the manufacturing cost and the assembly/wiring cost.

As shown in FIGS. 5 and 7(A)–7(C), the half arms 41, 42 are provided in the form of two pairs to be arranged above and below the front and rear portions of the sensor plate 51 to clamp the sensor plate 51. Since the half arms 41, 42 have the same configuration, a description will be made as only an upper half arm 41.

The half arm 41 comprises a half arm body 41c which is a rectangular plate with an attachment hole 41e (FIGS. 7(B), 7(C)) formed in the center thereof. The half arm 41 further comprises wings 41a extending in the left and right directions from edges of the body 41c near the sensor plate center, and levee-like supports 41b formed on the backs of the wings 41a and extending in the left and right directions. The top of each support 41b is slightly edged.

Hereinafter, a description will be made as regard to the assembly structure of the upper and lower half arms 41, 42, the sensor plate 51, and the Z arm action portion 23j.

Since the lower surface of the body 41c of the upper half arm 41 and the upper surface of the body 42c of the lower half arm 42 are flat, these are fixed to the surface of the sensor plate 51 without backlash. The wings 41a, 42a of the upper and lower half arms 41, 42 are arranged in such a manner that the supports 41b, 42b face each other. Sandwiched between the supports 41b, 42b is the action portion 23j of the Z arm 23. The supports are positioned at the middle (the neck (the region 51c) of the sensor plate 51) of a region between the two strain gauges 54a and 54c or 54d and 54b.

As a load is exerted on the pin brackets 25 of the seat weight measuring apparatus 9, the Z arms 23 slightly pivot to raise the action portions 23j. FIG. 7(C) schematically and exaggeratedly shows the state of the sensor plate and the half arms.

As the action portions 23j of the Z arms are raised, the supports 41b of the upper half arms 41 are pushed up.

Therefore, moments M are applied to the front or rear end portion of the sensor plate 51. By these moments M, the strain gauges 54a, 54b on the front and rear end portions are tensioned, while the strain gauges 54c, 54d near the center are compressed.

The front side strain gauges 54a, 54c are distorted according to the load on the front-side portion of the seat, while the strain gauges 54b, 54d are distorted according to the load on the rear-side portion of the seat. The variations in the resistances of the respective strain gauges are obtained as electrical signals whereby the one load cell measures the loads on the front-side and rear-side portions of the seat.

As can be seen from the foregoing description, in the seat weight measuring apparatus of the present invention, the components of the load cells for measuring loads on front and rear locations on left and right sides of the seat are arranged as compact as possible, thereby reducing the number of load cells, the manufacturing cost, and also assembly/wiring cost. Even with the reduced number of the load cells, the loads on the four locations, front and rear on left and right sides can be measured, thereby detecting the center of gravity of the passenger.

Further, the transmitting mechanism selectively transmits vertical loads on the connecting mechanisms to the load sensors and transmits as little lateral loads as possible from the connecting mechanism to the load sensor wherein the lateral loads cause error of the load sensors, thereby measuring the weight of the passenger with higher precision.

Figure 9:
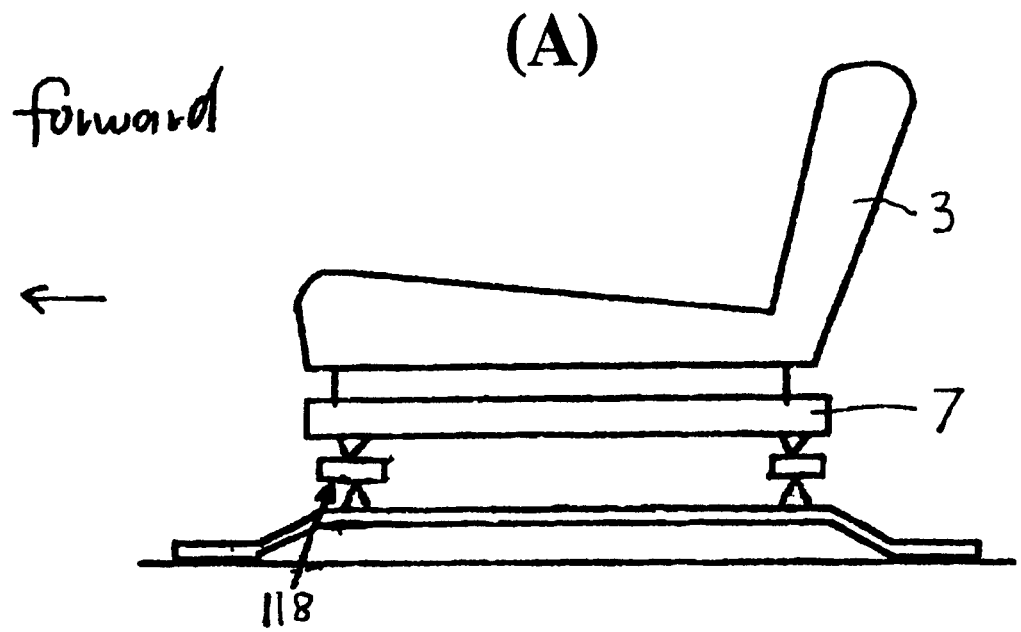
FIG. 9(A) is a side view schematically showing a fourth embodiment.
FIG. 9(B) is a plan view of the seat weight measuring apparatus of the fourth embodiment.
Figure 9:
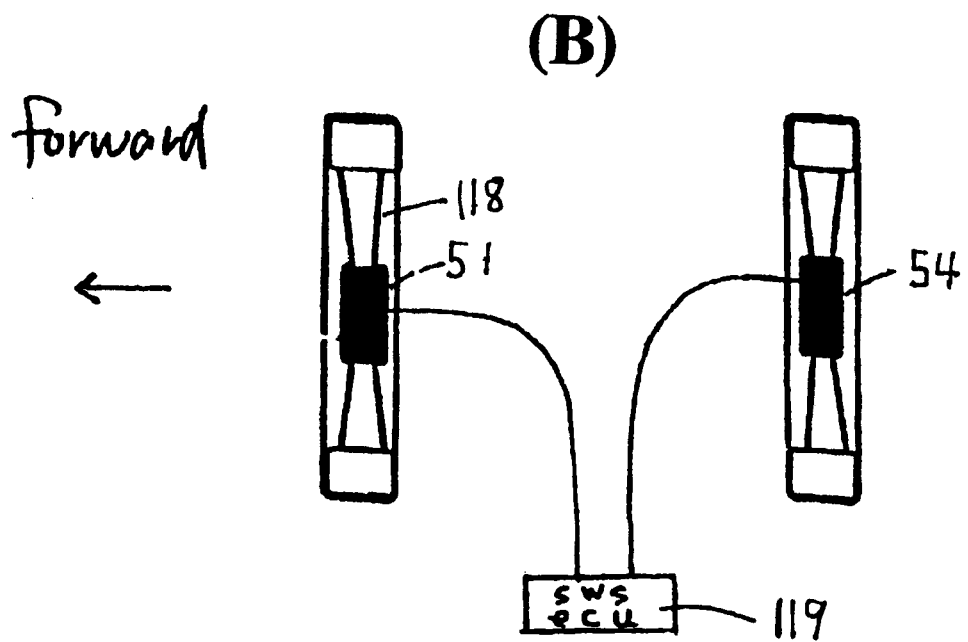

FIGS. 9(A) and 9(B) illustrate a fourth embodiment of the present invention. The fourth embodiment is similar to the first embodiment except that the seat weight measuring apparatus is arranged so that the long side of each of the four transmitting mechanisms 118 is perpendicular to the direction of seat rail movement (forward direction). Thus, a front sensor plate 51 is used to measure the vertical load at the front-right and front-left corners while a back sensor plate 54 is used to measure weight at the back-right and back-left corners. The load sensors 51, 54 output signals to a seat weight sensor electronic control unit 119. In this forth embodiment and in the other embodiments, the seat weight electronic control unit 119 outputs signals to an airbag electronic control unit.

Figure 10:
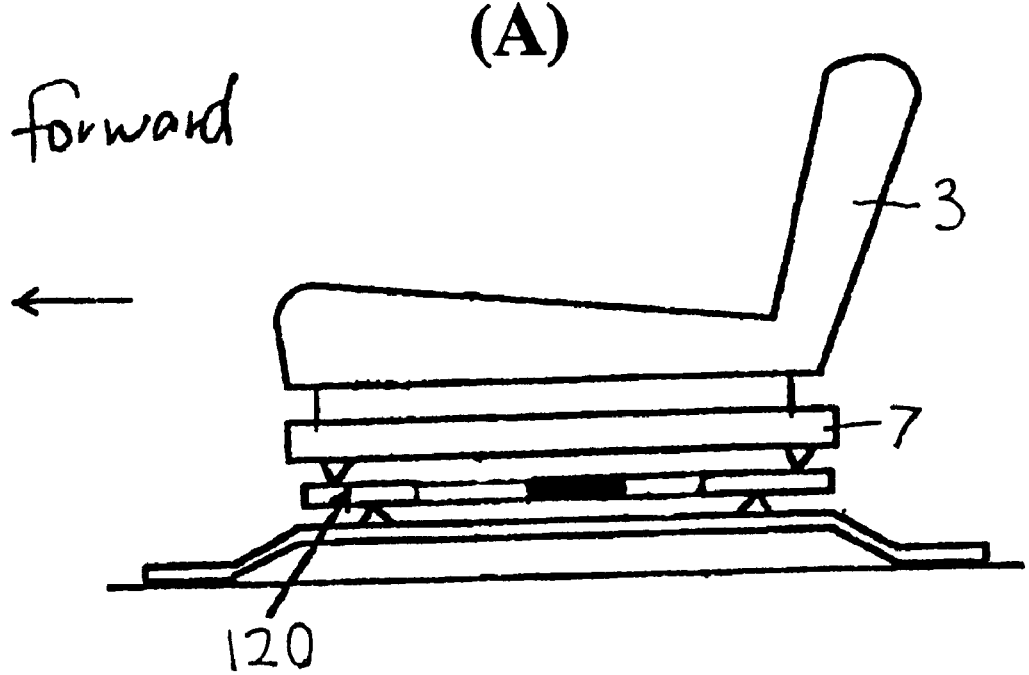
FIG. 10(A) is a side view schematically showing a fifth embodiment.
FIG. 10(B) is a plan view of the seat weight measuring apparatus of the fifth embodiment.
Figure 10:
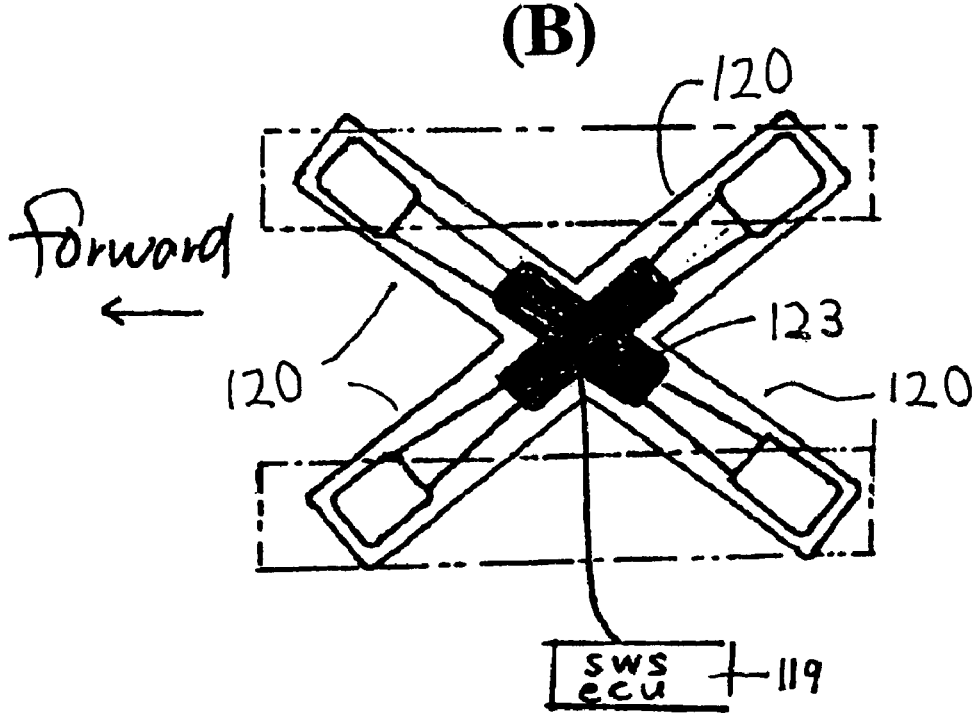

FIGS. 10(A) and 10(B) illustrate a fifth embodiment of the present invention. The fifth embodiment is similar to the first embodiment except that the seat weight measuring apparatus is arranged so that the long side of transmitting mechanism 120 is directed toward the center of the seat to form an "X" shape. Thus, only a single sensor plate 123 is required.

Figure 11:
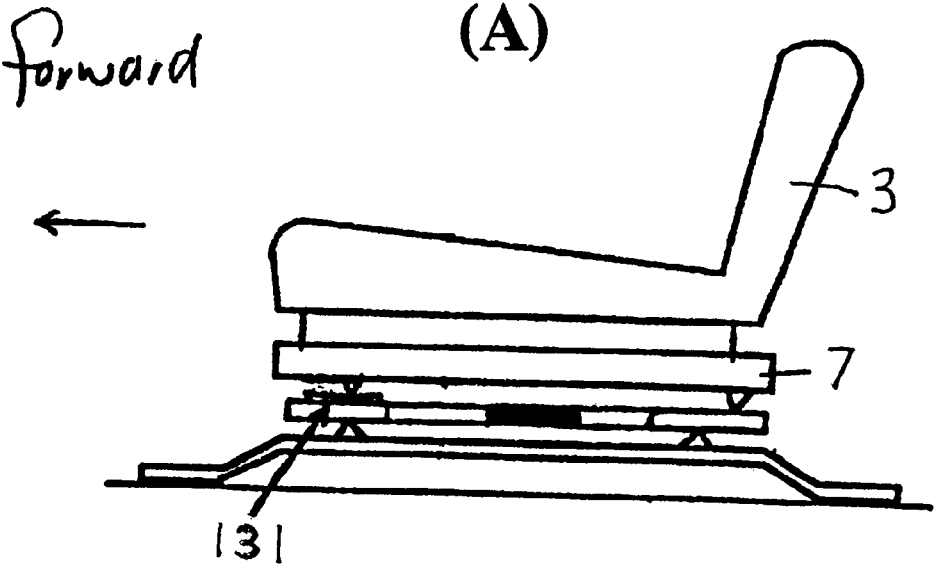
FIG. 11(A) is a side view schematically showing a sixth embodiment.
FIG. 11(B) is a plan view of the seat weight measuring apparatus of the sixth embodiment.
Figure 11:
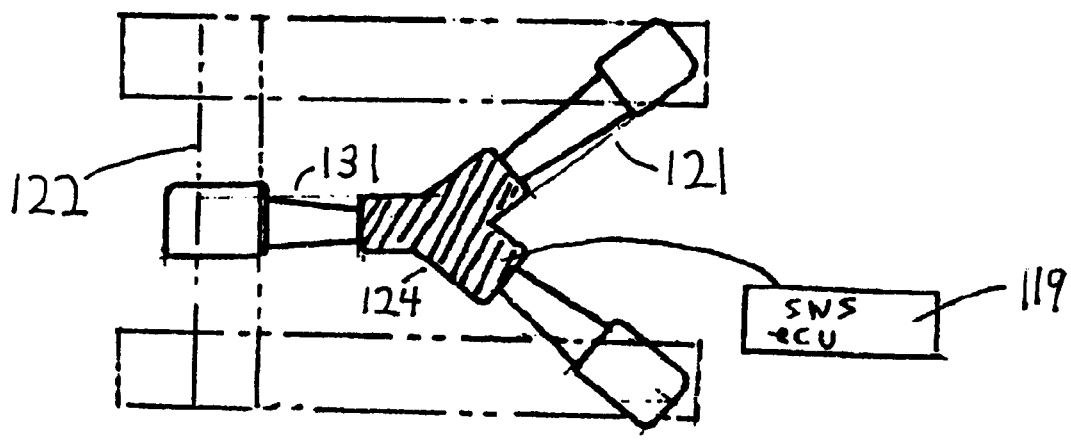

FIGS. 11(A) and 11(B) illustrate a sixth embodiment of the present invention. The sixth embodiment is similar to the first embodiment except that three transmitting mechanisms 121, 121, 131 are used to form a seat weight measuring apparatus having a "Y" shape. A cross-brace 122, which is part of transmitting mechanism 131, extends between and is mounted to the connecting mechanisms at the front-right and front-left seat corners. Thus, transmitting mechanism 131 transmits the load on the front-right and front-left seat corners to the sensor plate 124. Two transmitting mechanisms 121 are mounted to and transmit the load on the connecting mechanisms on the back-left and back-right seat corners, respectively. Thus, only a single sensor plate 124 is required.

Figure 12:
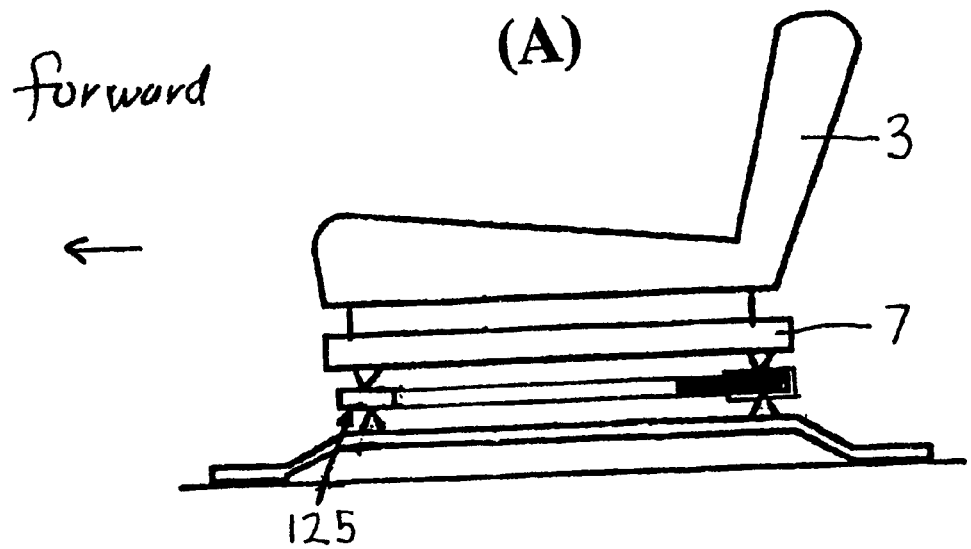
FIG. 12(A) is a side view schematically showing a seventh embodiment.
FIG. 12(B) is a plan view of the seat weight measuring apparatus of the seventh embodiment.
Figure 12:
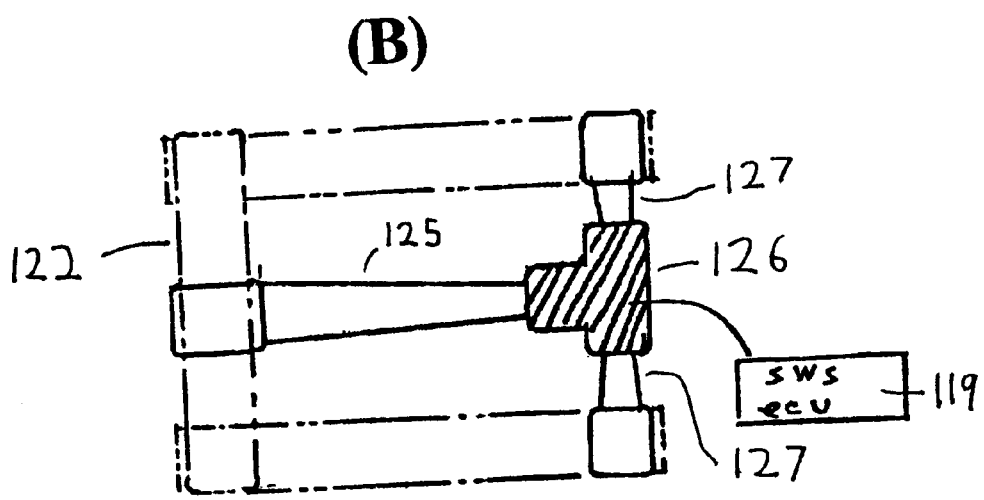

FIGS. 12(A) and 12(B) illustrate a seventh embodiment of the present invention. The seventh embodiment is similar to the sixth embodiment except that the seat weight measuring apparatus forms a "T" shape instead of a "Y" shape.

Transmitting mechanism 125 forms the long portion of the "T" and comprises a cross-brace 122 (similar to the sixth embodiment). Two transmitting mechanisms 127, which are attached to the back-right and back-left connecting mechanisms, form the top of the "T". Like in the sixth embodiment, a single sensor plate 126 is required.

Figure 13:
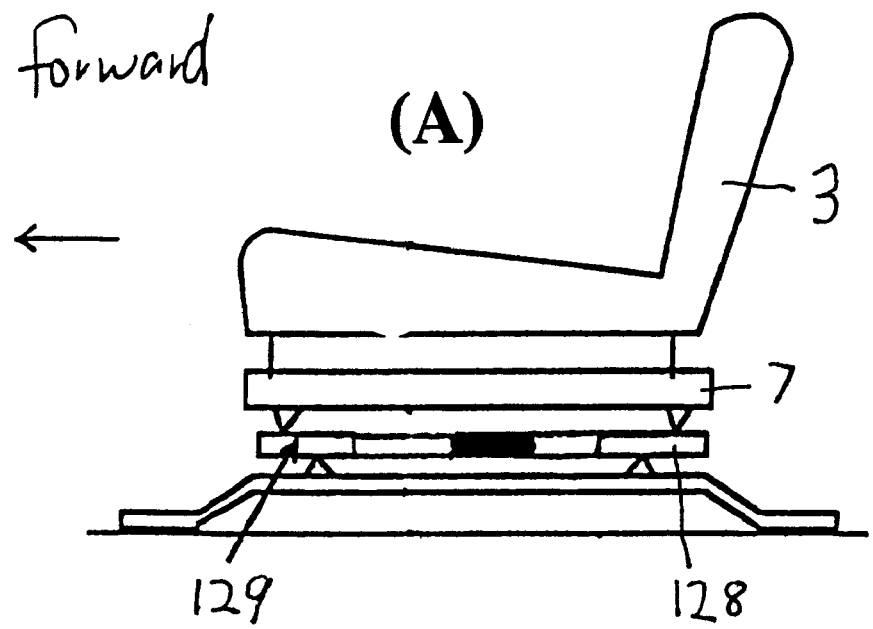
FIG. 13(A) is a side view schematically showing a eighth embodiment.
FIG. 13(B) is a plan view of the seat weight measuring apparatus of the eighth embodiment.
Figure 13:
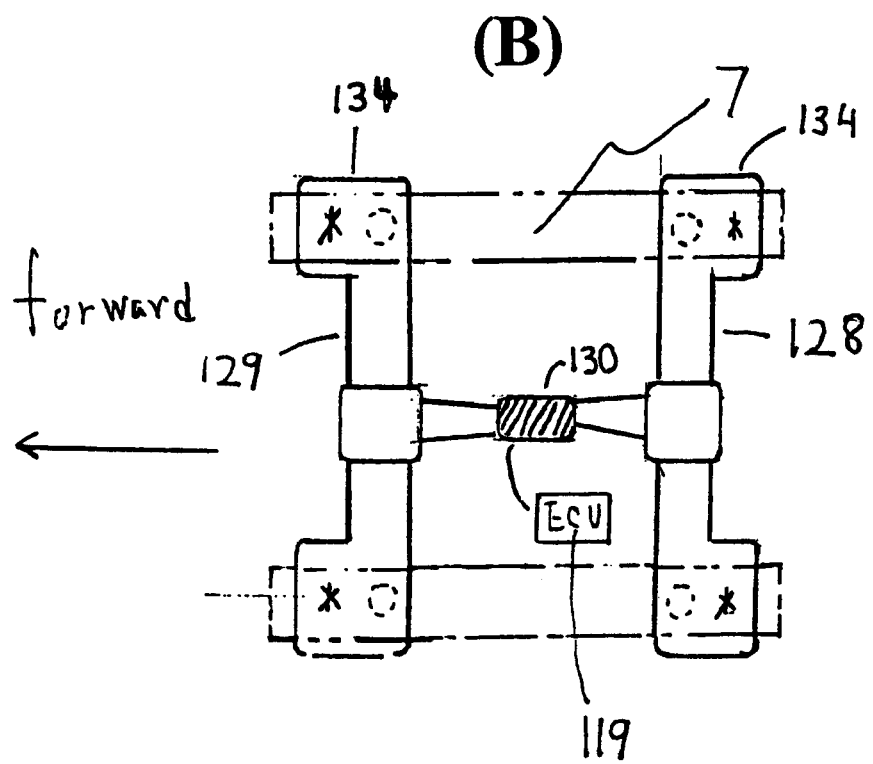

FIGS. 13(A) and 13(B) illustrate an eighth embodiment of the present invention. The eighth embodiment is similar to the first embodiment except as explained below. A single transmitting mechanism 128 transmits the load on the connecting mechanisms of both the back-right and back-left seat corners to the sensor plate 130. Cross-brace 134 of transmitting mechanism 128 is connected to the connecting mechanisms at the back-right and back-left seat corners. Similarly, a single transmitting mechanism 129 transmits the load on the connecting mechanisms of the front-right and front-left seat corners to the sensor plate 130. Cross-brace 134 of transmitting mechanism 129 is connected to the connecting mechanisms at the front-right and front-left seat corners The two transmitting mechanisms are arranged between and are substantially parallel to the seat rails, forming an "I" shape. A single sensor plate 130 is required.

Figure 14:
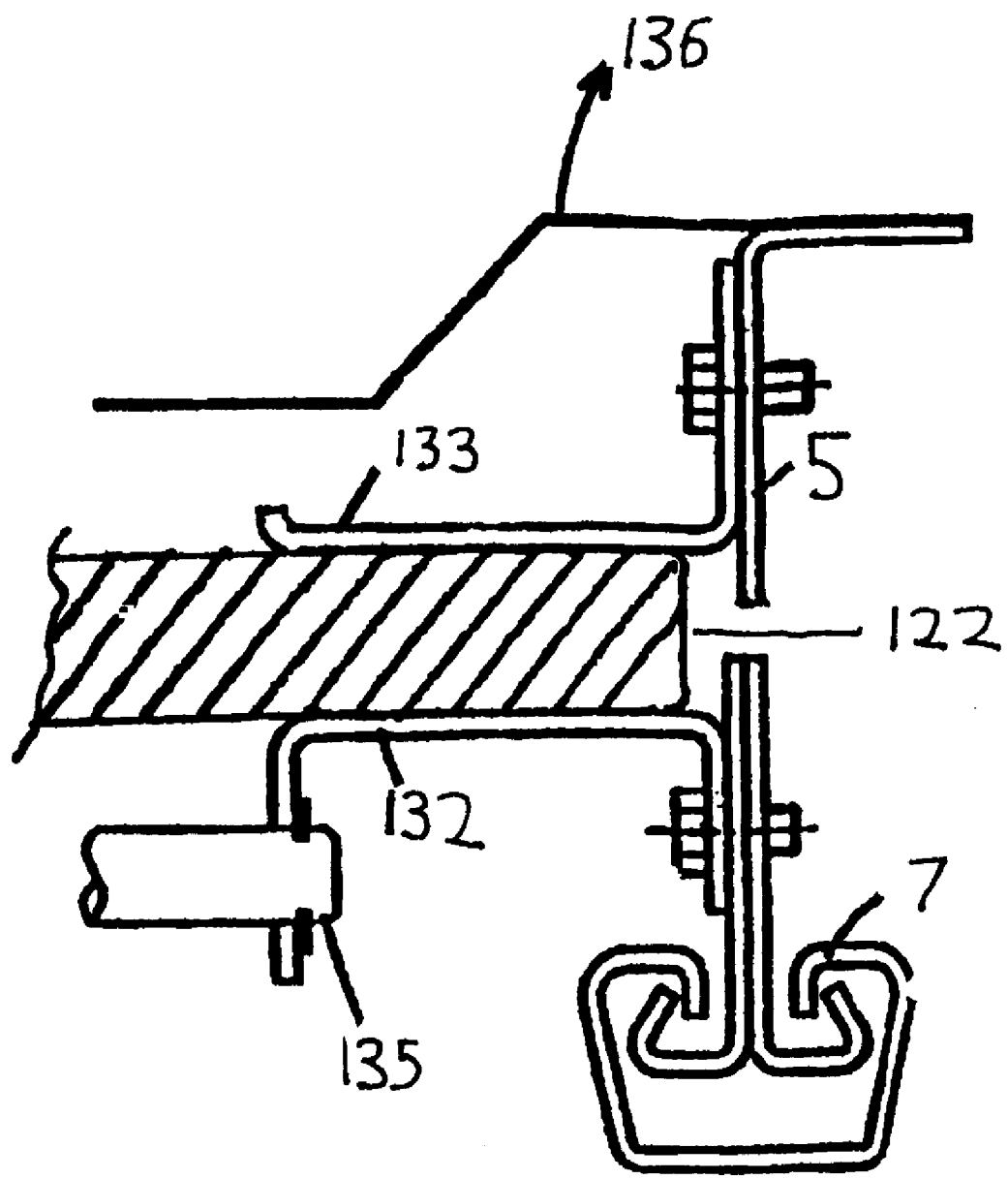
FIG. 14 is a front view of any of the sixth through eighth embodiments.

FIG. 14 is a front view showing the connection of cross-brace 122 of the transmitting mechanisms of any of the sixth and seventh embodiments. This drawing also applies analogously to cross-brace 134 of the eighth embodiment. Cross-brace 122 is held between upper bracket 133 and lower bracket 132. Upper bracket 133 is attached to seat frame 5. Seat frame 5 is attached to seat pan 136. Reinforcement 135 is provided for lower bracket 132.

The priority document here Japanese Application No. H11-061339, filed Mar. 9, 1999, (including its specification, drawings, and claims), is hereby incorporated by reference into this application.

I claim:

1. A seat weight measuring apparatus for measuring the seat weight of a vehicle seat including the weight of a passenger sitting thereon, comprising:

one or more load cells having a plurality of sensors, each sensor of which converts at least a part of the seat weight into an electrical signal;

connecting mechanisms arranged at four locations, front and rear on left and right sides, which bear the seat weight, for connecting the vehicle seat and the seat fixing portions of a vehicle body; and transmitting mechanisms for transmitting the action of the seat weight born by the connecting mechanisms to said load sensors, wherein said one or more load cells includes a plurality of sensors, to each of which action is transmitted from a corresponding transmitting mechanism;

wherein each of said connecting mechanisms include a pivot extending perpendicular to the vertical direction for allowing the pivotal movements in a vertical direction to selectively transmit vertical loads to said load sensors.

2. A seat weight measuring apparatus for measuring the seat weight of a vehicle seat including the weight of a passenger sitting thereon, comprising:

a load cell having a plurality of sensors, each of which converts at least a part of the seat weight into an electrical signal;

connecting mechanisms arranged at four locations, front and rear on left and right sides, which bear the seat weight, for connecting the vehicle seat and the seat fixing portions of a vehicle body; and transmitting mechanisms for transmitting the action of the seat weight born by the connecting mechanisms to said load sensors, wherein each of said transmitting mechanisms or said connecting mechanisms has an arm which is pivotally supported by a pivot extending perpendicular to the vertical direction, and the action according to the pivotal movement of each arm is transmitted to each of said load sensors, and said one load cell includes a plurality of the sensors, to each of which action is transmitted from a corresponding arm.

3. A seat weight measuring apparatus as claimed in claim 2, wherein said load cell and said arms are connected to each other by one horizontal shaft so as to allow the pivotal movement in the vertical direction.

4. A seat weight measuring apparatus as claimed in claim 2, wherein each of said arms has a designed flexible configuration at at least one controlled position.

5. A seat weight measuring apparatus as claimed in claim 2, further comprising burdening members, each of which is pivotally connected to each arm, for bearing at least a part of the seat weight, wherein a horizontal distance (span) between the pivot of said arm and a point where said burdening member is connected to said arm: a horizontal distance between the pivot of said arm and a point where said arm acts on said load sensor is in a range from 1:3 to 1:10.

6. A seat weight measuring apparatus as claimed in claim 5, wherein the horizontal distance between the pivot of said arm and the point where said burdening member is connected to said arm is from 15 mm to 50 mm.

7. A seat weight measuring apparatus as claimed in claim 5, wherein the horizontal distance between the pivot of said arm and the point where said arm acts on said load sensor is from 120 mm to 180 mm.

8. A seat weight measuring apparatus as claimed in claim 2, wherein certain play exists between said arm and said load cell.

9. A seat weight measuring apparatus for measuring the seat weight of a vehicle seat including the weight of a passenger sitting thereon, comprising:

a load cell having a plurality of sensors, each of which converts at least a part of the seat weight into an electrical signal;

connecting mechanisms arranged at four locations, front and rear on left and right sides, which bear the seat weight, for connecting the vehicle seat and the seat fixing portions of a vehicle body; and transmitting mechanisms for transmitting the action of the seat weight born by the connecting mechanisms to said load sensors, wherein each of said transmitting mechanisms has a designed flexible configuration at one or more controlled positions to provide for selective transmission of vertical loads on the connecting mechanisms to the load sensors.

10. A seat weight measuring apparatus for measuring the seat weight of a vehicle seat including the weight of a passenger sitting thereon, comprising:

a load cell having a plurality of sensors, each of which converts at least a part of the seat weight into an electrical signal;

connecting mechanisms arranged at four locations, front and rear on left and right sides, which bear the seat weight, for connecting the vehicle seat and the seat fixing portions of a vehicle body; and transmitting mechanisms for transmitting the action of the seat weight born by the connecting mechanisms to said load sensors, wherein
 each of said transmitting mechanisms or said connecting mechanisms has an arm which is pivotally supported by a pivot extending perpendicular to the vertical direction,
 the action according to the pivotal movement of each arm is transmitted to a corresponding one or more of said load sensors, and
 said arm has a designed flexible configuration at one or more controlled positions.

11. A seat weight measuring apparatus as claimed in claim 1, wherein four transmitting mechanisms are provided, each transmitting mechanism being attached to one of the four connecting mechanisms.

12. A seat weight measuring apparatus as claimed m claim 11, wherein a long side of each of the transmitting mechanisms is parallel to a forward direction of the seat.

13. A seat weight measuring apparatus as claimed in claim 12, wherein the one or more load cells comprises first and second load cells, and wherein the action of front-right and back-right transmitting mechanisms are transmitted to the first load cell and the action of front-left and back-left transmitting mechanisms are transmitted to the second load cell.

14. A seat weight measuring apparatus as claimed in claim 11, wherein a long side of each of the transmitting mechanisms is perpendicular to a forward direction of the seat.

15. A seat weight measuring apparatus as claimed in claim 14, wherein the one or more load cells comprises first and second load cells, and wherein the action of front-right and front-left transmitting mechanisms are transmitted to the first load cell and the action of back-left and back-right transmitting mechanisms are transmitted to the second load cell.

16. A seat weight measuring apparatus for measuring the seat weight of a vehicle seat including the weight of a passenger sitting thereon, comprising:
 one or more load cells having a plurality of sensors, each sensor of which converts at least a part of the seat weight into an electrical signal;
 connecting mechanisms arranged at four locations, front and rear on left and right sides, which bear the seat weight, for connecting the vehicle seat and the seat fixing portions of a vehicle body; and
 transmitting mechanisms for transmitting the action of the seat weight born by the connecting mechanisms to said load sensors,
 wherein said one or more load cells includes a plurality of sensors, to each of which action is transmitted from a corresponding transmitting mechanism; and
 wherein four transmitting mechanisms are provided, each transmitting mechanism being attached to one of the four connecting mechanisms; and
 wherein each of the four transmitting mechanisms are pointed toward a center of the seat to form a shape substantially like the letter X, and the one or more load cells comprises a single load cell that measures the transmitted loads from each of the transmitting mechanisms, the load cell being generally positioned in the center of the seat.

17. A seat weight measuring apparatus for measuring the seat weight of a vehicle seat including the weight of a passenger sitting thereon, comprising:
 one or more load cells having a plurality of sensors, each sensor of which converts at least a part of the seat weight into an electrical signal;
 connecting mechanisms arranged at four locations, front and rear on left and right sides, which bear the seat weight, for connecting the vehicle seat and the seat fixing portions of a vehicle body; and
 transmitting mechanisms for transmitting the action of the seat weight born by the connecting mechanisms to said load sensors, wherein
 said one or more load cells includes a plurality of sensors, to each of which action is transmitted from a corresponding transmitting mechanism;
 wherein: three transmitting mechanisms are provided;
 first and second transmitting mechanisms are connected to the back-right and back-left connection mechanisms, respectively;
 a third transmitting mechanism is connected to both the front-right and front-left connecting mechanisms in order to transmit the combined load of the front-right and front-left connecting mechanisms;
 the one or more load cells is a single load cell that measures the loads transmitted by the three transmitting mechanisms and is positioned generally in the center of the seat such that the transmitting mechanisms, which each point to the load cell, form a shape substantially like the letter Y.

18. A seat weight measuring apparatus for measuring the seat weight of a vehicle seat including the weight of a passenger sitting thereon, comprising:
 one or more load cells having a plurality of sensors, each sensor of which converts at least a part of the seat weight into an electrical signal;
 connecting mechanisms arranged at four locations, front and rear on left and right sides, which bear the seat weight, for connecting the vehicle seat and the seat fixing portions of a vehicle body; and
 transmitting mechanisms for transmitting the action of the seat weight born by the connecting mechanisms to said load sensors, wherein
 said one or more load cells includes a plurality of sensors, to each of which action is transmitted from a corresponding transmitting mechanism;
 wherein: three transmitting mechanisms are provided;
 first and second transmitting mechanisms are connected to the back-right and back-left connection mechanisms, respectively;
 a third transmitting mechanism is connected to both the front-right and front-left connecting mechanisms in order to transmit the combined load of the front-right and front-left connecting mechanisms; and
 the one or more load cells is a single load cell that measures the loads transmitted by the three transmitting mechanisms and is positioned between the back-right and back-left connecting mechanisms such that the transmitting mechanisms, which each point to the load cell, form a shape substantially like the letter T.

19. A seat weight measuring apparatus as claimed in claim 1, wherein:
 first and second transmitting mechanisms are provided, the transmitting mechanisms being generally parallel to a forward direction of the seat;
 the first transmitting mechanism is connected to both the front-right and front-left connecting mechanisms in order to transmit the combined load of the front-right and front-left connecting mechanisms;
 the second transmitting mechanism is connected to both the back-right and back-left connecting mechanisms in order to transmit the combined load of the back-right and back-left connecting mechanisms; and the one or more load cells is a single load cell that measures the loads transmitted by the two transmitting mechanisms and is positioned generally in the center of the seat such that the transmitting mechanisms, which each point to the load cell, form a shape substantially like the letter I.

20. A seat weight measuring apparatus for measuring the seat weight of a vehicle seat including the weight of a passenger sitting thereon, comprising:

one or more load cells having a plurality of sensors, each sensor of which converts at least a part of the seat weight into an electrical signal;

connecting mechanisms arranged at four locations, front and rear on left and right sides, which bear the seat weight, for connecting the vehicle seat and the seat fixing portions of a vehicle body; and transmitting mechanisms for transmitting the action of the seat weight born by the connecting mechanisms to said load sensors, wherein said one or more load cells includes a plurality of sensors, to each of which action is transmitted from a corresponding transmitting mechanism;

wherein each of said transmitting mechanisms include a pivot extending perpendicular to the vertical direction for allowing pivotal movements in a vertical direction to selectively transmit vertical loads to said load sensors.

* * * * *